United States Patent [19]
Weber

[11] Patent Number: 5,400,898
[45] Date of Patent: Mar. 28, 1995

[54] CONVEYING SYSTEM WITH CONVEYOR CHAINS

[75] Inventor: Bruno Weber, Berg, Switzerland

[73] Assignee: Ferag AG, Hinwil, Switzerland

[21] Appl. No.: 192,866

[22] Filed: Feb. 7, 1994

[30] Foreign Application Priority Data

Feb. 11, 1993 [CH] Switzerland ............. 00422/93

[51] Int. Cl.⁶ ............................................. B65G 23/00
[52] U.S. Cl. ........................... 198/792; 198/831; 198/839; 198/845
[58] Field of Search ............. 198/334, 792, 831, 839, 198/845, 852

[56] References Cited

U.S. PATENT DOCUMENTS

| | | | |
|---|---|---|---|
| 3,319,778 | 5/1967 | Bessant | 198/831 X |
| 4,895,239 | 1/1990 | Johnson et al. | 198/831 X |
| 4,951,807 | 8/1990 | Roinstad et al. | 198/778 |
| 4,993,540 | 2/1991 | van Capelleveen | 198/831 X |
| 5,141,102 | 8/1992 | Roinstad et al. | 198/778 X |

FOREIGN PATENT DOCUMENTS

| | | |
|---|---|---|
| 0303457 | 2/1989 | European Pat. Off. |
| 1280734 | 10/1968 | Germany |
| 984757 | 3/1965 | United Kingdom |

*Primary Examiner*—H. Grant Skaggs
*Assistant Examiner*—Carol L. Druzbick
*Attorney, Agent, or Firm*—Walter C. Farley

[57] ABSTRACT

A conveying system has at least two equidistant conveyor chains. In order that the chain links of the conveyor chains also move synchronously on conveying path portions in which the radii of curvature of the individual chain paths differ from one another, the chain link spacings can be adapted by corresponding control means to the ratio of the radii of curvature of the individual chain paths.

7 Claims, 5 Drawing Sheets

CONVEYING SYSTEM WITH CONVEYOR CHAINS

FIELD OF THE INVENTION

The invention relates to a conveying system having conveyor chains, whose links carry holding elements, clamping elements or the like for conveying individual units, e.g. printed products.

BACKGROUND OF THE INVENTION

Conveyor chains are a known conveying means, particularly in the field of the further processing of printed products, where they are typically used with grippers for conveying individual printed products. Using such conveyor chains with grippers, such as are described in the following patents of the same applicant: CH-644,816 (U.S. Pat. No. 4,381, 056), CH-592,562 (U.S. Pat. No. 3,955,667) or CH-588,647 U.S. Pat. No. 4,294,345), it is possible, if they are equipped with corresponding members movable against one another and guided in corresponding channels, to cover conveying paths in all directions (three degrees of freedom) and in particular with a large number of direction changes.

If the grippers are large, the units to be conveyed heavy and/or if for any reason the chain has to be positioned laterally or asymmetrically with respect to the units to be conveyed, the forces acting on the chain not in the conveying direction can become excessive. In such cases and as is described in Swiss patent application 1730/92-8 U.S. Pat. No. 5,188,349) of the same applicant, parallel to the chain path are provided rails or similar support means, on which are supported and guided e.g. by means of support rolls the said grippers. Such arrangements also make it possible to cover conveying paths having three degrees of freedom. They are suitable over relatively horizontal conveying paths, but offer no assistance in the case of very steep or even vertical conveying paths, so that they represent a restriction with respect to the conveying path configuration. In such cases, the grippers can also be positioned between two equidistantly positioned chains, but this restricts the conveying path configuration to two degrees of freedom, i.e. a restriction of the conveying path to a plane perpendicular to the surface in which the two chains run.

SUMMARY OF THE INVENTION

An object of the present invention is to provide a conveying system with conveyor chains, which can be used on a very large number of conveying paths in the same way as the aforementioned conveyor chain with grippers, i.e. in particular on conveying paths with three degrees of freedom, while also making it possible to convey without difficulty heavy and in particular not centrally graspable units to be conveyed.

According to the invention the conveying system has a plurality of conveyor chains, which are equidistant over at least part of the conveying path, i.e. have a constant spacing and e.g. there is an equidistantly directed pair of chains. Like the aforementioned conveyor chains, said chains comprise links movable against one another and e.g. in each case one chain link of one chain is firmly connected to a chain link of the other, e.g. by means of corresponding rods to which the holding or clamping elements are fixed or by said holding or clamping elements themselves. In order that such connected chains, whose links must move synchronously, are usable over conveying path portions which are curved in such a way that the individual chain paths have different radii of curvature and consequently different lengths. According to the invention the length of the chain links of at least part of the chains or the spacing between said links is adjustable by corresponding control means. Thus, all or at least part of the chains are designed in such a way that the spacings in the conveying direction between in each case two identical points on two successive chain links (link spacing) are lengthenable and/or shortenable. This lengthenability or shortenability of the link spacings can be brought about in two different ways, which will briefly be described hereinafter. On the one hand, one or more chains of the conveying system can have links, which in a basic state are interconnected with a fixed link spacing (basic spacing), but for curvatures with unequal chain path lengths, can be detached from one another in such a way that the link spacing can be adjusted in accordance with the conveying path curvature. Over linear conveying path portions or conveying path portions which are only curved perpendicular to the surface fixed by the chains, the chain is in its basic state and for other path portions is transformed by corresponding control means into the state with detached links. A chain having detachable and reconnectable links must be used together with a chain having constantly connected links. The spacings of the detached chain links are passively set by connecting elements between the links of the two chains. The chain with the detachable links is only drivable over those conveying path portions in which it is in the basic state, so that via the link connection it is possible to transfer tension and/or thrust forces. In the detached state the chain links act in the same way as the support rolls mentioned in connection with Swiss application 1730/92-8 U.S. Pat. No. 5,188,349). It is therefore advantageous to guide the chain e.g. on steep, but linearly directed conveying path portions in the basic state and, if necessary, also drive the same.

On the other hand one or more chains of the conveying system can have effectively lengthenable and/or shortenable chain links, whose lengths are adapted to conveying path portions with different radii of curvature for the different chain paths by corresponding control means. This takes place actively in proportion to the radii of curvature of the different chain paths, while each link remains permanently connected to the neighbouring links of the same chain. It is possible to conceive conveying systems with two or more such chains and more than one of the chains can be driven over the entire conveying path.

It is obviously also possible to conceive mixed conveying system forms, in which use is made of both the former and the latter types of conveyor chains.

BRIEF DESCRIPTION OF THE DRAWINGS

The invention is described in greater detail hereinafter relative to embodiments of the conveying systems according to the invention and parts thereof and whereof the function and construction are described with reference to the attached drawings, wherein.

DESCRIPTION OF THE PREFERRED EMBODIMENTS

Figure 1:
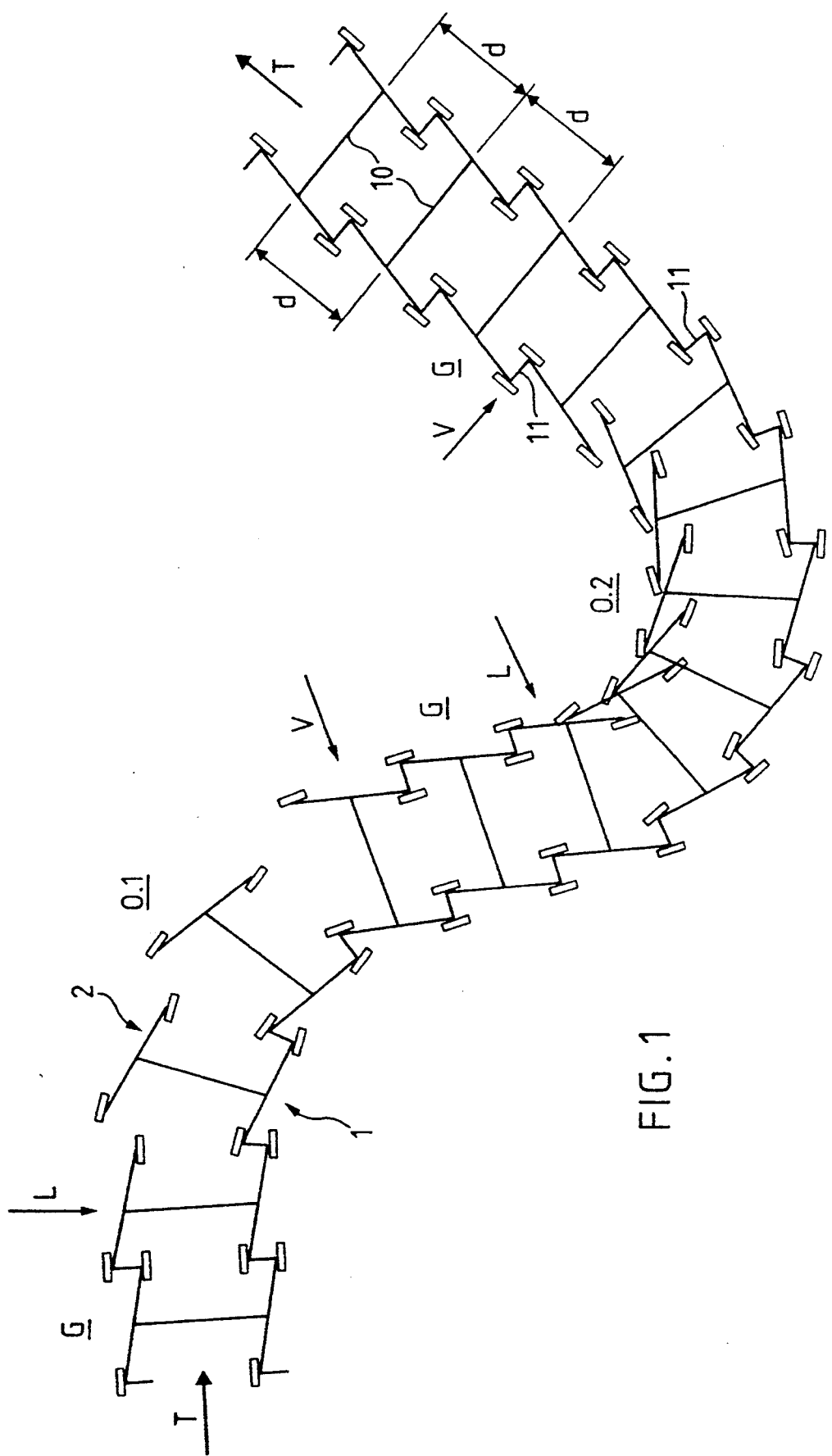
FIG. 1 is a schematic plan view of a portion of a conveying path having an embodiment of a conveying system in accordance with the invention with a chain pair wherein one chain has detachable links.

FIG. 1 shows in the form of a schematic plan view a portion of a conveying path of an embodiment of the conveying system according to the invention with a chain pair, in which each link of one chain is connected to a link of the other chain by a connecting element 10. A first chain 1 has constantly interconnected links (link spacing=basic spacing d) and is driven or drivable. In a basic state, a second chain 2 has, over the conveying path portions G (both chain paths with the same radii of curvature) interconnected links with a basic spacing d, but over the conveying path portions O (different radii of curvature of the two chain paths) links which are detached from one another. The links of the second chain 2 are designed in such a way that not only can the link spacing be increased compared with the basic spacing d (conveying path portion 0.1) but can also be decreased (conveying path portion 0.2).

The links of the second chain have, as shown, spaced rollers in the conveying direction and which roll in a suitable chain, not shown guide. The two rollers of a chain link are in each case spaced on one or other side of a central line representing the chain path, so that the front roller of a following link in the conveying direction for the purpose of shortening the link spacings, can roll in front of the rear roller of the preceding link.

The chain links are provided with coupling elements 11 with the aid of which they can be detached from and connected to one another. For the detachment or release of the couplings at points L there are suitable coupling-releasing control means. For the reconnection of the links at points V there are coupling-closing control means. This applies for a conveying direction as indicated by the arrow T. In the reverse conveying direction the coupling-releasing and the coupling-closing control means are interchanged.

The links of the first chain can largely correspond to those of the second chain, without the links of the first chain having to be provided with detachable coupling elements.

As forces only have to be transferred in the conveying direction when the second chain 2 is in its basic state (conveying path portions G), it can only be driven over such paths. The detached chain links on the conveying path portions O merely serve as guidance supports.

Figure 2:
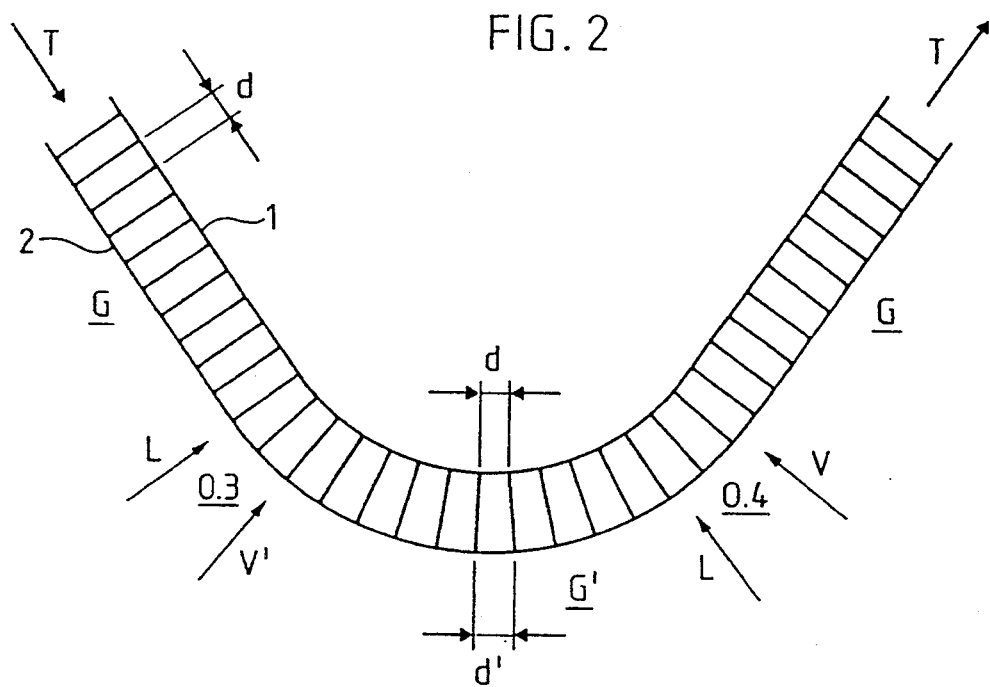
FIG. 2 is a schematic plan view of a portion of a conveying path with a chain pair in accordance with a further embodiment of the invention.

FIG. 2 shows a conveying system like that of FIG. 1, but the coupling elements of the links of the second chain are designed in such a way that the chain, beside having a basic state G, in which the links are interconnected with the basic spacing d (the same as the basic spacing of the first chain), the chain can have at least one further state G', in which the links are interconnected with a different link spacing d' adapted to a specific radius of curvature. When entering a corresponding curve (considered in the conveying direction T), such a chain is brought by control means L from the basic state G into a state O (0.3 and 0.4) with detached chains and remains there until a constant radius of curvature is obtained. Then, by a corresponding control means V', a state G' with connected links is produced (link spacing d' corresponding to the radius of curvature), in which the links pass through the curve. At the transition from the curve to an e.g. linear conveying path portion or a further curve with a different radius of curvature, once again control means L and V are provided.

FIGS. 1 and 2 show conveying paths running in a planar surface (paper plane). However, it can also be a plan form, i.e. the conveying path can assume random heights above or below the paper plane. Obviously embodiments in the sense of FIGS. 1 or 2 are possible, which have more than two chains. For example, on the other side of the first chain 1 can be provided a second chain and the three chains run equidistantly over at least part of the conveying path.

This means that the spacing between the first chain and the first further chain is always the same over this conveying path portion and the spacing between the first chain and the second further chain is also the same, but the two spacings can differ from one another.

FIGS. 1 and 2 show chains with links, which are interconnectable and detachable by a coupling element. However, it is also conceivable for the links to have continuously adjustable link connections (e.g. telescopic connections) in the length thereof in the conveying direction and which keep the links in an always connected state and the coupling elements do not fulfil the function of a connection of the links and instead fix the length of the link connection.

Figure 3:
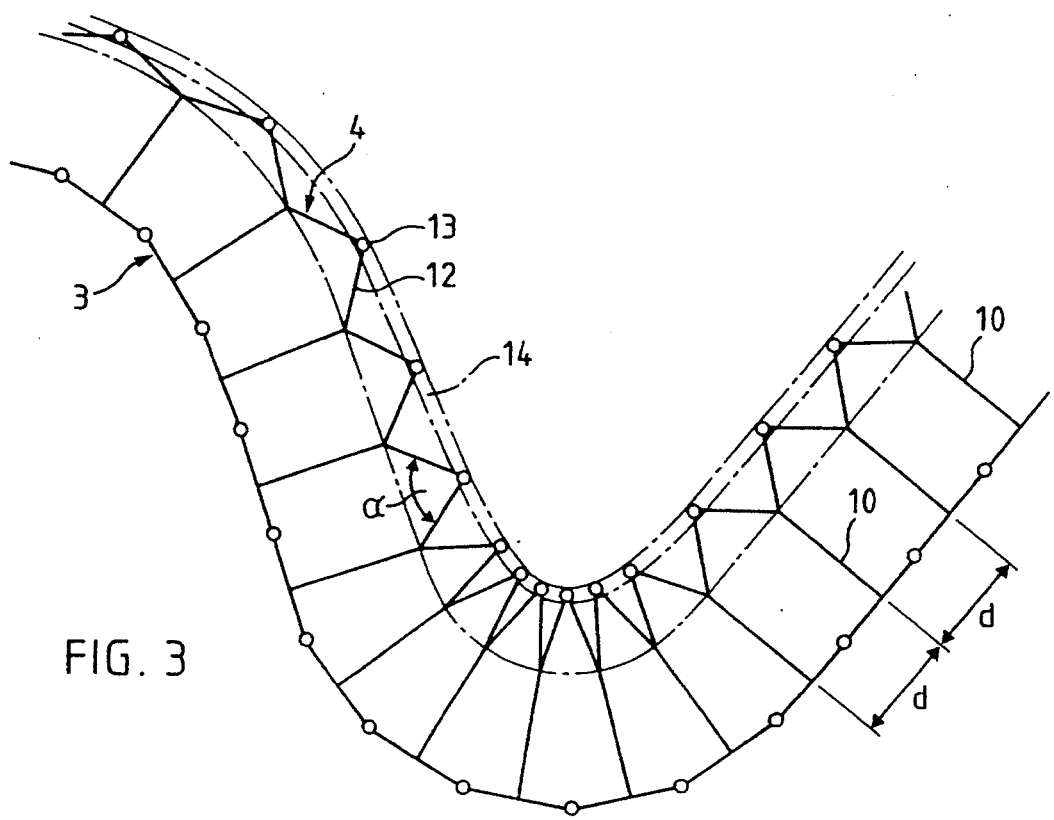
FIG. 3 is a schematic plan view of a conveying path with a chain pair in accordance with the invention with one chain having adjustable-length links.

FIG. 3 shows another embodiment of the conveying system according to the invention, once again with a conveyor chain pair, the links of the two chains being interconnected by connecting elements 10. A first chain 3 has constantly interconnected links, which have a constant basic spacing d. The second chain 4 also has constantly interconnected links, whose link or link spacing is shortenable or lengthenable in controlled manner with respect to the basic spacing d, in such a way that they are smaller, larger or equal to d.

The connection of the links of the second chain is brought about by connecting members, e.g. by a hinged bracket 12 having an approximately central joint 13 fixed in articulated manner to two adjacent links and in the vicinity of the joint 13 is e.g. fitted a control roll, which is controlled by a corresponding cam path means 14 in such a way that the buckling or kinking angle α of the hinged bracket 12 at all times corresponds to the ratio of the radii of curvature of the two chain paths. As in the embodiment according to FIG. 3 the two chains have constantly interconnected links, both chains can be driven. However, this also means that the two chains need not be interconnected by connecting elements 10. Thus, the pair of conveyor chains can be driven independently of one another, but their links move synchronously over conveying path portions with different chain path lengths (radii of curvature).

Figure 4:
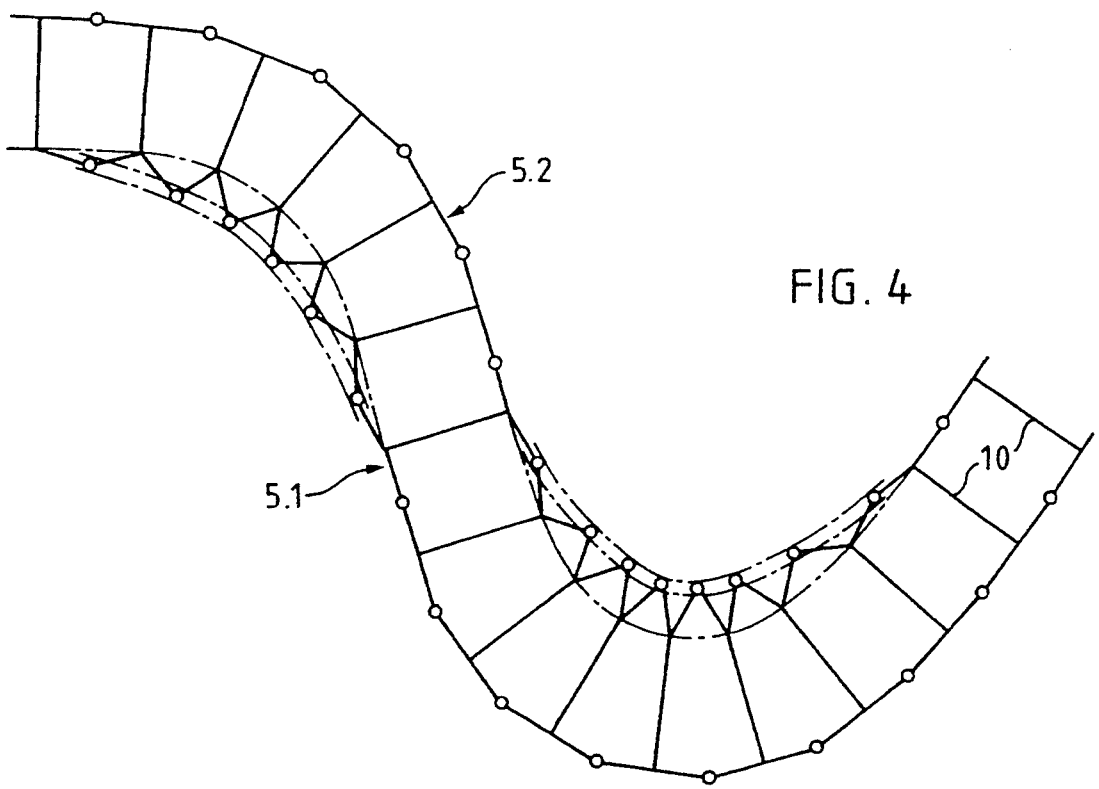
FIG. 4 is a plan view similar to FIG. 3 in which both chains have adjustable-length links.

FIG. 4 shows another embodiment of the inventive conveying system having a chain pair. There are two identical chains 5.1 and 5.2, which have constantly interconnected links with a shortenable link length or spacing. The connection between the links of each chain is e.g. brought about in the same way as in the embodiment according to FIG. 3. Over curved conveying path portions (with different radii of curvature of the two chain paths) by means of corresponding links the hinged brackets of the chain whose path has the smallest radius of curvature are kinked, whereas the hinged brackets of the other chain remain extended. Here again both chains can be driven jointly or individually over the entire conveying path.

The advantage of the embodiment according to FIG. 4 compared with that of FIG. 3 is that for the same radii of curvature of the conveying path portion and with identical link spacings there are smaller kinks of the hinged brackets, which reduces the loss of forces during conveying.

It is obviously also possible to conceive conveying systems, which have chains only with extendable link spacings.

It is obvious that the chains must be guided by corresponding guides over non-linear conveying path portions. The individual chains of an inventive conveying system need not be positioned equidistantly over the entire conveying path. It is also conceivable for them to have independent, individual chain paths over certain portions of the conveying path. To enable this to take place the connections 10 must either be omitted or made correspondingly detachable. It is also possible to rotate the individual chains against one another or to rotate the entire system, in that the chains are passed spirally around one another.

Figure 5B:
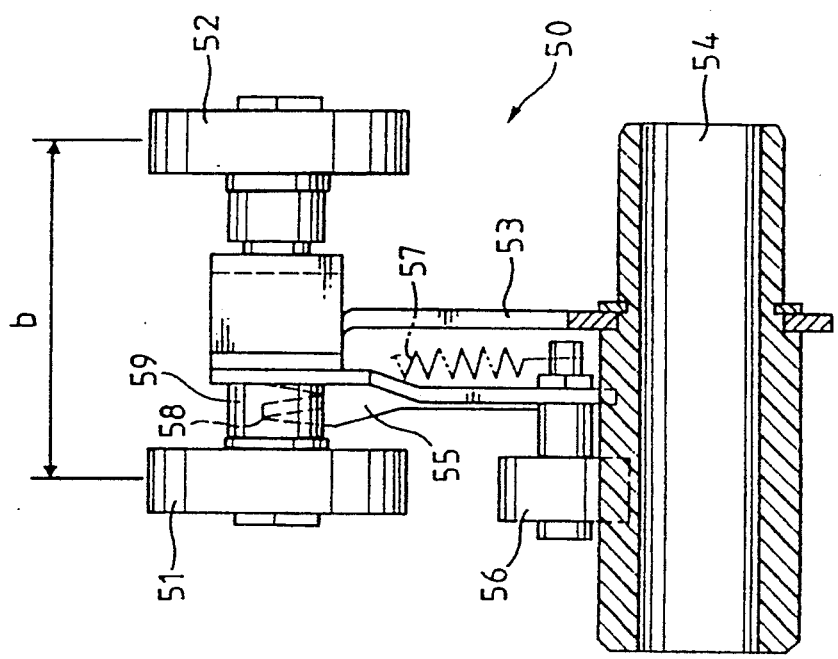
FIGS. 5a and 5b are side elevation and front elevation in section, respectively, of a chain link usable in the embodiment of FIG. 1.
Figure 5A:
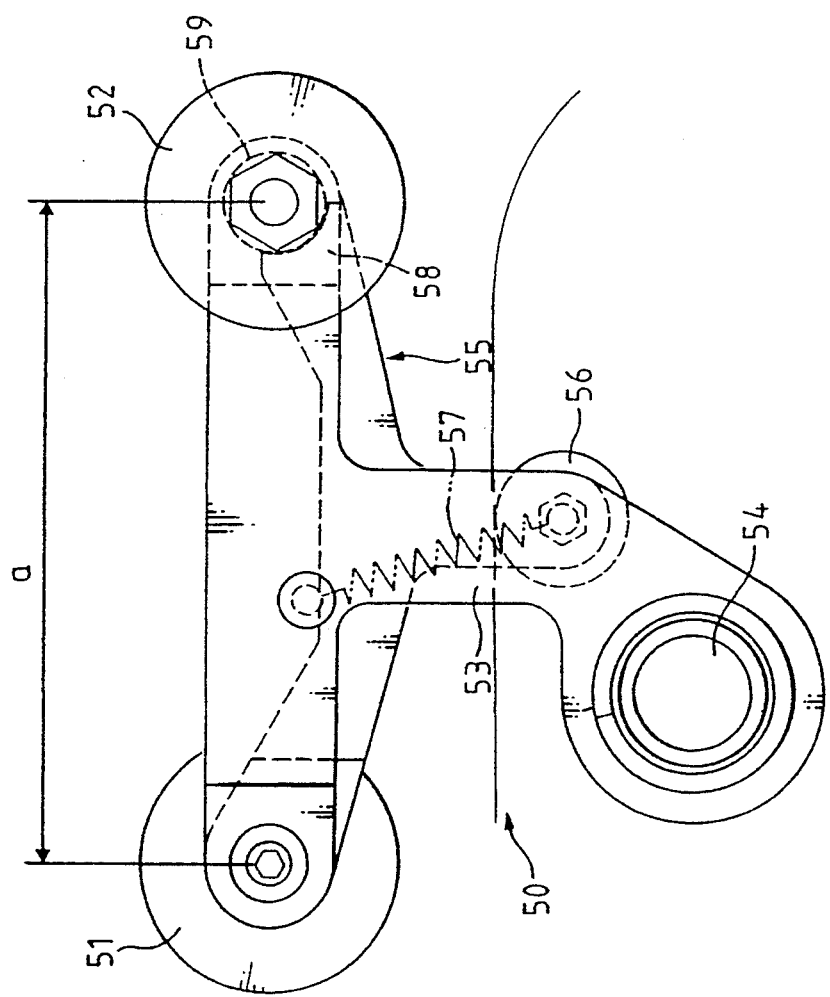

FIGS. 5a and 5b show in detail an embodiment of a chain link 50 for the chain 1 of the inventive conveying system according to FIG. 1. FIG. 5a shows the chain link perpendicular to the conveying direction, while FIG. 5b shows the same link parallel to the conveying direction. As mentioned in conjunction with FIG. 1, the chain link has two runners or rollers 51,52, which during the movement of the chain in the conveying direction roll in a not shown guide and namely spaced from one another not only in the conveying direction (spacing a), but also perpendicular thereto (spacing b). The two runners or rollers 51,52 are positioned rotatably on a chain link body 53, on which is also fixed, e.g. rotatably in a corresponding bearing 54 a not shown clamp or other holding or retaining element. The chain link 50 also has a coupling element 55, which is pivotable about the axis of one roller 51 and carries a control roll 56. As a function of the spacing of said control roll 56 from the rollers, a coupling arm 58 of the coupling element 55 extends into the vicinity of the spindles of the rollers or is spaced from this area. The coupling arm 58 has a notch corresponding to such a spindle 59 and can interact with the roller spindle of an adjacent chain link in such a way that the latter assumes a clearly defined position with respect to the considered link (basic state of the chain). In the case of an embodiment as shown in FIGS. 5a and 5b, this only applies if the chain is compressively loaded, i.e. operated in a pushed manner.

Figure 6:
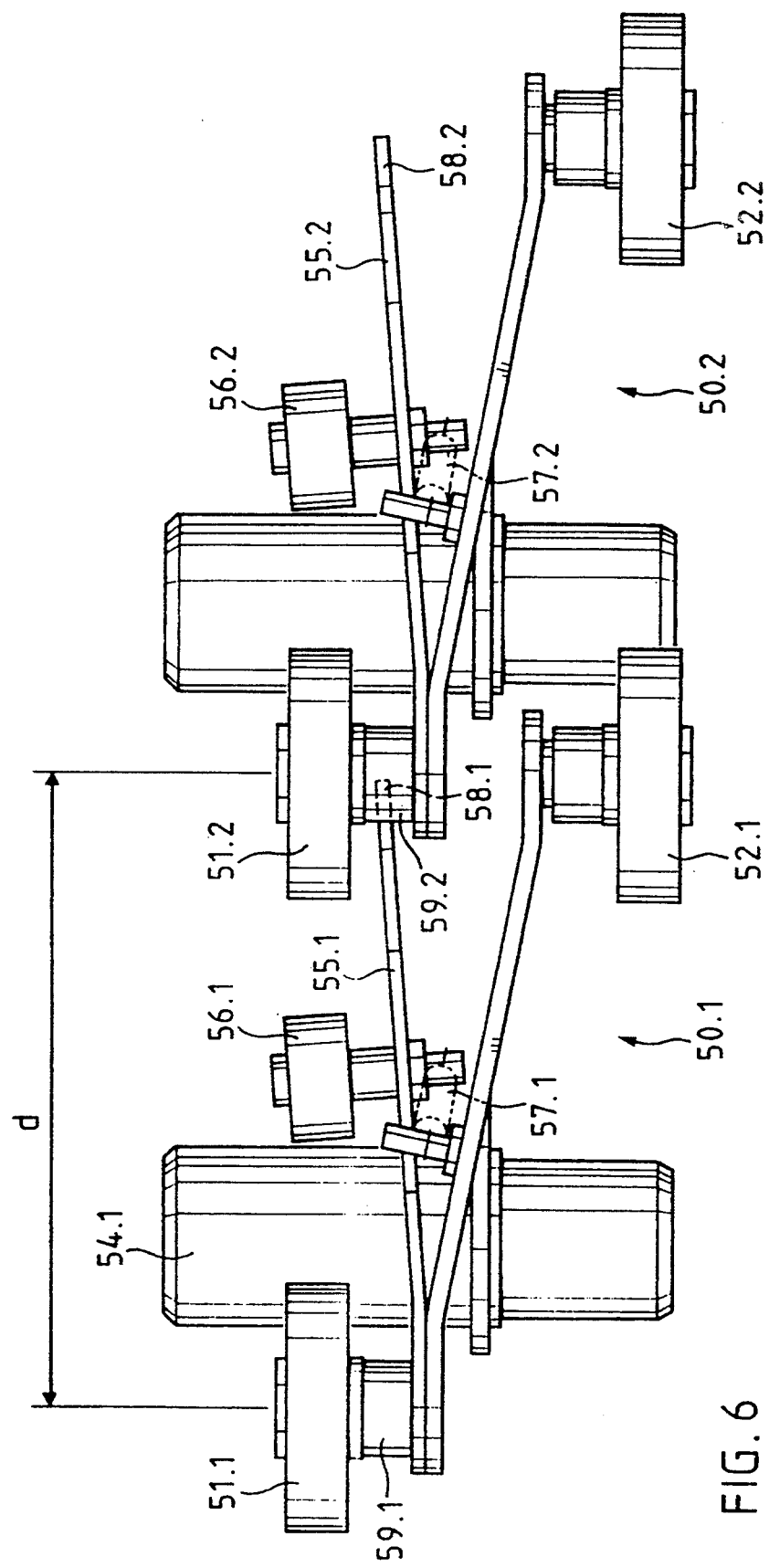
FIG. 6 is a top plan view of two successive chain links in accordance with FIGS. 5a and 5b.

FIG. 6 shows two chain links 50.1,50.2, as described in conjunction with FIGS. 5a and 5b, with a viewing direction perpendicular to the conveying direction and perpendicular to the viewing direction of FIG. 5a. The individual elements of the two links are given the same references as in FIGS. 5a and 5b and carry an additional .1 or .2 for each link. The two links shown represent the basic state of a corresponding chain, i.e. they are interconnected by a coupling element 55.1 with a specific link spacing (basic spacing d) (only for pushing operation). In this embodiment this basic spacing corresponds to the spacing between the rollers of a chain link in the conveying direction, although this is not prescribed. If the coupling element 55 is pivoted down, the two chain links can be moved closer to one another, i.e. the link spacing can become smaller than the basic spacing. Without a pushing force acting on the chain, it is also possible to increase the link spacing in the represented embodiment thereof, without pivoting the coupling element.

The control roll 56 is controlled with a corresponding, not shown control cam path means. So that in the basic state of the chain (pivoted up coupling arm) and pushing operation no control link means is required, the coupling element 55 additionally has a restoring element, e.g. a spring indicated by the dot-dash lines 57, through which it is held in this state, if an adjacent chain link is present in the spacing a.

Figure 7:
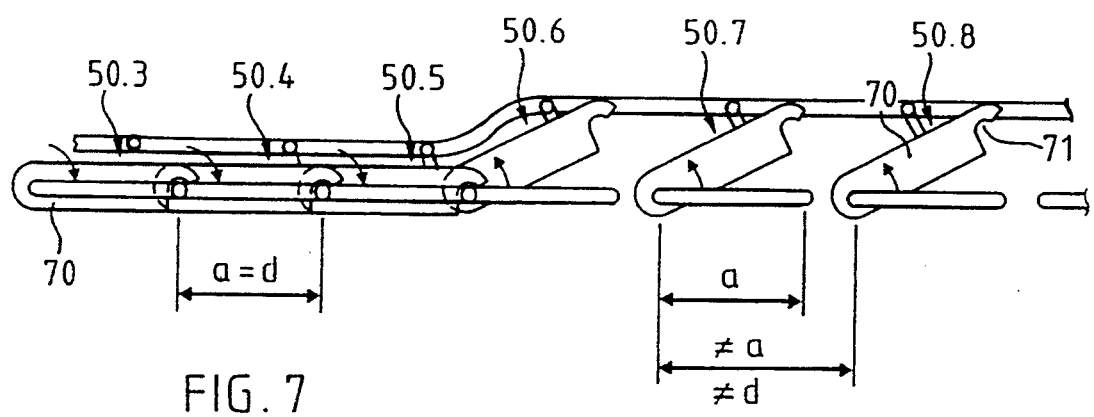
FIG. 7 is a schematic side elevation of a further embodiment of coupling elements in accordance with the invention.

FIG. 7 shows for the same embodiment of chain links as shown in FIGS. 5a and 5b coupling elements, which permit a clearly defined basic state of the chain, both under compressive and tensile load. The drawing only shows the roller spindles of the chain links 50.3 to 50.8 and they are diagrammatically connected by a line. In the basic state (basic spacing d the same as the roller spacing a), in each case one spindle of two adjacent links is located on the same axis. The coupling element 70 is a simple rocking lever, which is pivotable about the axis of one roller of a chain link, as described in conjunction with FIGS. 5 and 6. This rocking lever has a notch 71 corresponding to a roller spindle and namely at a distance from the pivot axis which corresponds to the basic spacing d. When the coupling element is pivoted down, the notch hooks into the roller spindle of the adjacent chain link and connects the two links in such a way that, independently of whether the chain is under tensile or compressive loading, they have a clearly defined spacing d from one another. If the coupling element is pivoted up by a corresponding control means, the chain links are detached from one another and their reciprocal spacing is randomly adjustable.

The chain links 50.3 to 50.6 shown in FIG. 7 are interconnected by downwardly pivoted coupling elements and represent the basic state of the chain. The chain links 50.7 and 50.8 are detached from one another and have a reciprocal spacing determined by the conveying path which is larger than the basic spacing d. However, in this state it is also possible to have link spacings which are smaller, identical or larger than d.

The coupling element shown in FIG. 7 can be controlled in the same way as that shown in FIGS. 5a and 5b with the aid of a not shown control roll and corresponding control cam path means.

If, in addition to a basic state, the chain is to be able to assume further states with connected links, but link spacings differing from the basic spacing (cf. FIG. 2), it is possible to provide on coupling element the different notches corresponding to predetermined link spacings.

I claim:

1. A conveying system comprising the combination of at least two chains bordering a conveying path in generally parallel relationship, each said chain having a plurality of links; connecting means for connecting each said link of a chain to a link of at least one other chain; a plurality of controllable coupling members, one said coupling member being positioned between successive links of one said chain, said coupling member being movable between an active state in which said successive links are connected together and an inactive state in which said links are unconnected; and control means for moving said coupling members between said active and inactive states whereby said successive links selectively are held in a predetermined spacing relationship or are allowed to move relative to each other, allowing the chains to adapt to changes in direction of the conveying path.

2. A system according to claim 1 wherein at least one chain other than said one chain include fixed coupling members between successive links of said chain holding said successive links at substantially constant spacing.

3. A system according to claim 1 wherein all said chains including said one chain include controllable coupling members between successive links whereby said successive links selectively are connected together or disconnected.

4. A system according to claim 1 wherein each said link of said one chain include front and rear rollers longitudinally spaced apart in a conveying direction and laterally offset from each other in a direction perpendicular to said conveying direction, and wherein said coupling member is movable to engage a roller of an adjacent link.

5. A system according to claim 4 wherein said coupling member comprises a coupling arm pivotable about a central axis of one roller, said arm including a notch to engage said roller of said adjacent link.

6. A system according to claim 5 wherein said control means includes a control cam path and said link includes a control roll connected to said coupling arm and engaging said cam path for pivoting said coupling arm.

7. A system according to claim 5 wherein central axes of said rollers are spaced apart a distance (a) equal to the spacing (d) between equivalent parts of said links.

* * * * *